United States Patent Office 3,033,669
Patented May 8, 1962

3,033,669
PROCESS FOR THE MANUFACTURE OF DICALCIUM PHOSPHATE
Alfred Strauchen and Jakow Breslerman, Haifa, Israel, assignors of thirty-three and three tenths percent to Fertilizers and Chemicals Limited, Haifa Bay, Israel, an Israeli company
No Drawing. Filed May 27, 1960, Ser. No. 32,082
Claims priority, application Israel July 16, 1959
5 Claims. (Cl. 71—39)

This invention relates to the manufacture of dicalcium phosphate (referred to hereinafter by the commercially accepted abbreviation "DCP").

One of the uses of DCP is as a supplement to animal food; another use is as a fertilizer.

For DCP used for animal food, which is designated in the trade as "feed-grade DCP," a high degree of purity is required. This means in particular that the DCP should have a low fluorine content, which is evaluated in terms of the $P_2O_5/F$ ratio. The manufacture of feed-grade DCP by known methods requires purifying operations or other special measures which cause relatively high losses of $P_2O_5$.

The invention provides a new process for the manufacture of feed-grade DCP, which process may be combined with the manufacture of fertilizer-grade DCP, by the decomposition of calcareous (i.e. calcium-carbonate-containing) rock phosphate with aqueous hydrochloric acid, which process is distinguished in that it produces a high yield of highly pure DCP and requires appreciably less hydrochloric acid than do conventional processes for the manufacture of feed-grade DCP.

The invention proposes a process for the manufacture of DCP, wherein in a first stage, a reaction liquor of pH 0.3 to 1 is produced by the decomposition of comminuted calcareous phosphate rock with aqueous hydrochloric acid; this liquor is slurried in a second stage with so much calcareous rock phosphate that the pH of the slurry is raised to within the range of 1.5 to 2.5; the solid matter of the slurry produced by the second stage is separated in a third stage from the liquid part thereof, and feed-grade DCP is precipitated from the separated liquid by the addition of calcium hydroxide or carbonate; and in a fourth stage the separated solid matter of the slurry produced by the second stage is dissolved in aqueous hydrochloric acid to form a liquor of a pH within the range of 0.3 to 1.0, which liquor is further processed for recovering therefrom the $P_2O_5$ in the form of DCP of either feed-grade or fertilizer-grade.

The optimal pH values of the liquors within the range of 0.3 to 1.0 in the first and fourth stages, and of the slurry within the range of 1.5 to 2.5 in the second stage, will be determined by experiment for each particular kind of rock phosphate.

According to one embodiment of the invention (hereinafter referred to as the "combined process"), the production of dicalcium phosphate from the acid solution prepared in the fourth stage of the process is performed without removal of the solid impurities which consist mainly of undissolved gangue and tricalcium phosphate introduced with the calcareous rock phosphate added in the second stage, and repreciptated fluorine compounds. The dicalcium phosphate thus obtained is of fertilizer-grade only. This combined process for the manufacture of both feed-grade DCP and fertilizer-grade DCP is favourably distinguished from known processes for the manufacture of either feed-grade DCP or fertilizer-grade DCP by the low acid consumption and the high rate of recovery of $P_2O_5$. It has been found that the loss of $P_2O_5$ caused by this process can be as low as 0.25% of the total amount of $P_2O_5$ of the rock phosphate used.

By another embodiment of the invention (hereinafter referred to as the "cyclic process"), feed-grade DCP is obtained from the acid liquor prepared in the fourth stage of the process. This makes it possible to perform the process in a cyclic manner and to continue it indefinitely, as the fourth stage is actually the first stage of a second cycle which will run through the same second and third stages as did the first cycle, and whose fourth stage is in turn the first stage of a third cycle, and so forth. In this cyclic process the liquors of pH 0.3 to 1.0 obtained by the first and fourth stages are freed from undissolved matter by filtration or in any other suitable manner. By this removal of the undissolved matter, about 4–5% of the total $P_2O_5$ of the starting material is lost.

In both the combined process and the cyclic process, a considerable proportion of hydrochloric acid is saved, as compared with known processes. This is due to the fact that in the second stage the pH is raised without addition of extraneous calcium hydroxide or calcium carbonate, merely by the decomposition of calcium carbonate contained in the calcareous rock phosphate added in the second stage. This calcium carbonate has to be decomposed both in known processes and in the process according to the invention. An extra amount of acid is required for this purpose in known processes, which is saved by the process according to the invention; it amounts to 10–15% or even more of the acid consumption of known processes.

In the combined process, the liquor of pH 0.3 to 1.0 prepared in the first stage is slurried, without being freed from undissolved matter, with a further portion of comminuted calcareous rock phosphate (second stage), whereby the pH of the slurry is raised to within the range of 1.5 to 2.5; then the entire solid matter is separated from the liquor (third stage), and from the clarified liquid feed-grade DCP is precipitated; the said solid matter is decomposed with aqueous hydrochloric acid to form a liquor of pH 0.3 to 1.0 (fourth stage); and without removal of the undissolved matter the liquor is admixed with so much calcium hydroxide or carbonate that all the solubilized $P_2O_5$ is precipitated as DCP.

The cyclic process for the manufacture of feed-grade DCP according to the second embodiment of the invention comprises the cyclic repetition of the following operations, viz.: the decomposition of calcareous phosphate rock with aqueous hydrochloric acid whereby a liquor having a pH within the range from 0.3 to 1.0 is obtained, and the clarification of this liquor; the raising of the pH of the clarified liquor to within the range of 1.5 to 2.5 by the admixture of calcareous rock phosphate, whereby all or part of the calcium carbonate of the admixed rock phosphate is decomposed and the tricalcium phosphate thereof is left substantially undecomposed; separation of the solid matter of the slurry thus prepared from the liquid part thereof; precipitation of dicalcium phosphate from the liquid part; dissolution of the solid matter aforesaid in aqueous hydrochloric acid to form a liquor of pH within the range from 0.3 to 1.0; and clarification of this liquor as a starting solution for a new cycle.

In both the combined process and the cyclic process, every operation of each cycle may be performed either continuously or as a batch process. In either case it is immaterial whether the rock phosphate introduced in the second or any subsequent cycle has the same composition as that used in the preceding cycle or cycles, provided it is calcareous.

In both the combined process and the cyclic process, 95 to 96% of the $P_2O_5$-contents of the rock phosphate are solubilized in the first stage. As the rock phosphate consists predominantly of fluorapatite, a considerable proportion of the fluorine of the starting material is solubilized at this stage together with the $P_2O_5$.

The resulting decomposition slurry contains gangue and undecomposed rock phosphate suspended in the highly acidic solution.

Only in the cyclic process these solids are separated from the solution in any suitable manner, e.g. by filtration. The total $P_2O_5$ losses of the process are essentially due to the removal of the solid matter at this stage. The $P_2O_5$ loss is of the order of 4% to 5% by weight of the $P_2O_5$ contained in the starting material.

Raising the pH of the clarified solution from the range of 0.3 to 1.0 to the range of 1.5 to 2.5 in the second stage removes the bulk of dissolved fluoride.

At the end of the second stage, the solid matter, consisting of undecomposed rock phosphate and some precipitated matter, is separated from the supernatant solution in any suitable manner, e.g. by decantation or filtration. This solution is largely free from fluorine and can, therefore, serve as a suitable starting solution for the preparation of DCP by precipitation. Before being further processed the solution is, if required, clarified in any suitable manner, e.g. by means of a polishing filter.

The DCP obtained from the solution by precipitation with calcium hydroxide, e.g. in the form of milk of lime, has a high degree of purity which makes it of feed-grade quality. Owing to the preceding removal of fluorides, the $P_2O_5/F$ ratio of the dried DCP is very high, e.g. of the order of 200 to over 400.

The invention is illustrated by the following examples to which it is not limited.

EXAMPLE 1

Combined Process

To a stirred suspension of 100 kg. of comminuted phosphate rock (containing 28.2% of $P_2O_5$, 3.2% of fluoride calculated as fluorine, with a $P_2O_5/F$ ratio 8.8, and 8.8% of $CO_2$) in 350 liters of water, 140 liters of aqueous HCl of 30% strength were slowly added. The mixture was stirred for about 30 minutes, and the pH of the slurry was then 0.92 which marked the end of the first stage of the process. This was followed at once by the second stage in which a second portion of 100 kg. of the same comminuted phosphate rock was added to the slurry and the mixture was stirred for 30 minutes. The pH rose to 2.24. After the interruption of the stirring the solids were allowed to settle. In the third stage the supernatant solution was separated from the solid matter and freed from suspended solids by means of a polishing filter. To the clear filtrate, so much milk of lime (containing 64 g. of CaO per liter) was added that the pH rose to 6.2, whereby dicalcium phosphate was precipitated. This precipitate was filtered off and dried and then contained 32.5% of the $P_2O_5$ of the starting material. Its composition was: 40.6% of $P_2O_5$ and 0.052% F; $P_2O_5/F$ ratio 780.

The residue on the polishing filter was 0.6 kg., calculated as dry matter, containing 24.5% of $P_2O_5$, or 0.26% of the $P_2O_5$ of the starting material. This was added to the solid residue of the second stage.

In the fourth stage of the process the solid residue of the second stage, consisting of undecomposed phosphate rock and a small amount of precipitated fluoride, was slurried with 250 liters of water, stirred and admixed with 172 liters of 30%-aqueous HCl. The stirring was continued for 30 minutes, and the pH was then 0.44. By the addition of milk of lime (containing 64 g. CaO/l.) until the pH had risen to 6.1, fertilizer-grade dicalcium phosphate was precipitated, which contained 67.1% of the $P_2O_5$ of the total phosphate used as starting material. The precipitate was filtered off and dried; it contained 36.8% of $P_2O_5$. The filtrate, containing 0.25% of the $P_2O_5$ of the total amount of phosphate rock used as starting material for both stages, was rejected. This represented the entire loss of $P_2O_5$.

EXAMPLE 2

Combined Process

To a stirred suspension of 100 kg. of comminuted phosphate rock (containing 33.2% $P_2O_5$, 3.5% of fluoride calculated as fluorine, with a $P_2O_5/F$ ratio of 9.5 and 4.1% of $CO_2$), in 400 liters of water, 126 liters of 30% aqueous HCl were slowly added. The mixture was stirred for about 30 minutes and the pH of the slurry was then 0.85 (end of the first stage). In the second stage a second portion of 100 kg. of the same comminuted phosphate rock was added to the slurry and the mixture was stirred for 30 minutes. The pH rose to 2.15. After the interruption of the stirring the solids were allowed to settle. In the third stage the supernatant solution was separated from the solid matter and freed from suspended solids by means of a polishing filter. To the clear filtrate, so much milk of lime (containing 74 g. of CaO/liter) was added that the pH rose to 6.0, whereby dicalcium phosphate was precipitated. The precipitate was filtered off and dried and then contained 34.1% of the $P_2O_5$ of the starting material. Its composition was: 41.8% of $P_2O_5$ and 0.068% of F; $P_2O_5/F$ ratio 615. The residue on the polishing filter was 1.1 kg., calculated as dry matter, containing 26.8% of $P_2O_5$, or 0.45% of the $P_2O_5$ of the strating material. It was added to the solid residue of the second stage.

In the fourth stage the solid residue of the second stage, consisting of undecomposed phosphate rock and a small amount of precipitated fluoride, was slurried with 300 liters of water with stirring. To this slurry 156 liters of 30%-aqueous HCl were added and the stirring was continued for 30 minutes. The pH was then 0.40. By the addition of milk of lime (containing 74 g. of CaO/liter) the pH was raised to 6.3 whereby fertilizer-grade dicalcium phosphate was precipitated. This precipitate, filtered and dried, contained 38.2% of $P_2O_5$ (65.6% of the $P_2O_5$ of the starting material). The filtration waste liqudr contained 0.18% of the $P_2O_5$ of the starting material.

EXAMPLE 3

Cyclic Process

The raw material was rock phosphate containing 27.2% of $P_2O_5$, 2.8% of F ($P_2O_5/F$ ratio=9.7), and 10.9% of $CO_2$.

To a stirred suspension of 100 kg. of this phosphate in 320 liters of water, 160 liters of aqueous 30%-by-weight HCl were slowly added. The slurry was thereafter stirred for 30 minutes; after the end of this time its pH had adjusted itself to 0.35. The slurry was then filtered through an acid-proof filter. After drying the solid residue amounted to 19.5 kg. and contained 5.6% or 1.09 kg. of $P_2O_5$, being 4% of the total amount of $P_2O_5$ of the starting material.

The clarified solution of pH 0.35 was stirred and admixed with a second batch of 100 kg. of the same rock phosphate and the stirring was continued for 30 minutes. The pH of the slurry was thereby raised to 1.85 owing to the fact that some amount of acid had decomposed a corresponding amount of calcuim carbonate. At the same time most of the solubilized fluorine was reprecipitated.

The slurry was then allowed to settle and the supernatant solution was removed from the sediment by decantation. The solution was clarified by filtration and its pH was raised to 6.2 by the addition of milk of lime (containing 82 g. of CaO per liter), whereby feed-grade DCP was precipitated. The filtered, washed and dried dicalcium phosphate contained 40.2% of $P_2O_5$ and 0.095% of fluorine, with a $P_2O_5/F$ ratio of 420.

The sediment remaining after the decantation of the solution of pH 1.85 was suspended in 250 liters of water, the suspension was stirred and admixed with 134 liters of a 30%-by-weight aqueous hydrochloric acid and the mixture was stirred for 30 minutes; at the end of this time its pH had adjusted itself to 0.38. The acid solution was filtered. The filter cake was washed with water and, after drying, amounted to 20.3 kg. containing 5.7% (1.31 kg.) of $P_2O_5$, being 4.8% of the total amount of the $P_2O_5$ of the starting material used for this cycle.

The combined filtrate and washing waters were admixed with another portion of 100 kg. of the same phosphate, whereby a second cycle was started.

The amount of HCl (in the form of a 30%-by-weight aqueous solution) saved by the process according to the invention corresponds roughly to 26 liters, being the difference between the amount of 160 liters requirred for preparing the original solution of pH 0.3–1.0 at the beignning of the entire operation, and the amount of 134 liters required for preparing the solution of similar acidity serving for starting the second (and each further) cycle. Calculated on the acid requirement of 160 liters, this means a saving of about 16% of hydrochloric acid.

EXAMPLE 4

Cyclic Process

With the same rock phosphate as used in Example 3, the first cycle of the process was carried out as described in Example 3.

The second cycle which, according to Example 3, was started by the addition of another portion of 100 kg. of the same phosphate, was, however, started in this present example by the addition of 100 kg. of a rock phosphate of somewhat different composition, namely: 28.1% of $P_2O_5$, 3.4% of F and 9.8% of $CO_2$, with a $P_2O_5/F$ ratio of 8.3 The slurry was stirred for 30 minutes when its pH had adjusted itself to 1.78. Stirring was then stopped and the solid matter allowed to settle. The supernatant solution was decanted and clarified by polishing filtration, and milk of lime containing 82 g. of CaO/liter was added until the pH had risen to 6.4, whereby DCP was precipitated. The filtered and dried DCP was of feed-grade purity; it contained 0.08% of fluorine corresponding to a $P_2O_5/F$ ratio of 500.

The residue remaining after the decantation was again dissolved in aqueous hydrochloric acid from a solution of pH 0.3–1.0 with which to start another cycle.

We claim:

1. A process for the manufacture of DCP comprising, in a first stage, decomposing comminuted calcareous rock phosphate with aqueous hydrochloric acid to produce a liquor having a pH within the range from 0.3 to 1.0; slurrying said liquor, in a second stage, with calcareous rock phosphate to raise the pH of the slurry to within the range of 1.5 to 2.5; separating, in a third stage, the solid matter of the slurry produced in the second stage from the liquid part thereof and precipitating feed-grade DCP from the separated liquid by the addition to the latter of a compound selected from the group consisting of calcium hydroxide and calcium carbonate; in a fourth stage, dissolving in aqueous hydrochloric acid the solid matter separated in the third stage from the second stage slurry to form a liquor having a pH in the range of 0.3 to 1.0; and precipitating DCP from the liquor produced in the fourth stage.

2. A process according to claim 1, wherein substantially equal amounts of phosphate rock are used as starting material for the first and second stages.

3. A process according to claim 1, wherein the precipitation of feed-grade DCP from said liquid in the third stage is effected by means of milk of lime.

4. A cyclic process for the manufacture of feed-grade DCP, comprising, as an initial stage, the step of decomposing comminuted calcareous rock phosphate with aqueous hydrochloric acid to produce a liquor having a pH within the range of 0.3 to 1.0, and removing undissolved matter from this liquor; and thereafter the cyclic recurrence of the following operations: in a second stage, slurrying said liquor with calcareous rock phosphate to raise the pH of the slurry to within the range of 1.5 to 2.5; in a third stage, separating the solid matter of the slurry produced in the second stage, from the liquid part thereof and precipitating feed-grade DCP from the separated liquid by the addition to the latter of a compound selected from the group consisting of calcium hydroxide and calcium carbonate; in a fourth stage, dissolving in aqueous hydrochloric acid the solid matter separated in the third stage from the second stage slurry to form a liquid having a pH in the range of 0.3 to 1.0, removing undissolved matter from this liquor and recycling the liquor for use as a starting solution in a subsequent cycle of the said recurrent operations.

5. A combined process for the manufacture of feed-grade DCP and fertilizer-grade DCP comprising, in a first stage, decomposing comminuted calcareous rock phosphate with aqueous hydrochloric acid to produce a liquor having a pH within the range of 0.3 to 1.0; slurrying said liquor, in a second stage, with calcareous rock phosphate to raise the pH of the slurry to within the range of 1.5 to 2.5; separating, in a third stage, the solid matter of the slurry produced in the second stage from the liquid part thereof and precipitating feed-grade DCP from the separated liquid by the addition to the latter of a compound selected from the group consisting of calcium hydroxide and calcium carbonate; in a fourth stage dissolving in aqueous hydrochloric acid from the second stage slurry to form a liquor having a pH in the range of 0.3 to 1.0; and thereafter admixing the liquor produced in the fourth stage with a compound selected from the group consisting of calcium hydroxide and calcium carbonate, thereby precipitating fertilizer-grade DCP, and separating this precipitate from the liquid part of said slurry.

References Cited in the file of this patent

UNITED STATES PATENTS

| | | |
|---|---|---|
| 2,114,600 | Larsson | Apr. 19, 1938 |
| 2,211,918 | Turrentine | Aug. 20, 1940 |